(12) United States Patent
Peterson

(10) Patent No.: US 8,201,963 B2
(45) Date of Patent: *Jun. 19, 2012

(54) FLASHLIGHT WITH PHOTOVOLTAIC POWER SOURCE

(76) Inventor: Terry J. Peterson, Dammeron Valley, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/696,547

(22) Filed: Jan. 29, 2010

(65) Prior Publication Data
US 2010/0271813 A1 Oct. 28, 2010

Related U.S. Application Data

(63) Continuation of application No. 11/748,756, filed on May 15, 2007, now Pat. No. 7,670,023.

(60) Provisional application No. 60/800,923, filed on May 15, 2006.

(51) Int. Cl.
F21L 4/00 (2006.01)

(52) U.S. Cl. .................. 362/183; 320/101; 320/136

(58) Field of Classification Search .............. 362/109, 362/158, 183, 184, 202, 208; 320/14, 101, 320/115, 136, 103, 116
See application file for complete search history.

(56) References Cited

U.S. PATENT DOCUMENTS

| 2,531,325 A | 11/1950 | De Cesaris Frederick |
| D178,482 S | 8/1956 | Bacon |
| D205,451 S | 8/1966 | Schwartz |
| 4,548,013 A | 10/1985 | Briceno |
| 4,563,727 A * | 1/1986 | Curiel ............ 362/183 |
| D285,989 S | 10/1986 | MacDonald |
| 4,782,432 A * | 11/1988 | Coffman ............ 362/184 |
| 5,015,918 A | 5/1991 | Copeland |
| 5,143,442 A | 9/1992 | Ishikawa et al. |
| D337,200 S | 7/1993 | Keller |
| 5,347,186 A | 9/1994 | Konotchick |

(Continued)

FOREIGN PATENT DOCUMENTS

WO WO 02/103881 12/2002

OTHER PUBLICATIONS

U.S. Appl. No. 11/748,756, filed May 15, 2007, Peterson, Apr. 14, 2008 Office Action Jan. 21, 2009 Final Office Action May 8, 2009 Office Action Oct. 8, 2009 Notice of Allowance.

Primary Examiner — John A Ward
(74) Attorney, Agent, or Firm — Knobbe Martens Olson & Bear LLP

(57) ABSTRACT

A flashlight including a photovoltaic power source adapted to convert incident light energy to electrical energy and wherein the flashlight is configured such that the flashlight is induced to orient the photovoltaic power source to face upwards when the flashlight is placed on a generally horizontal surface. The flashlight can include a rechargeable battery pack so as to have a hybrid power supply. Also, a method of powering a flashlight including attaching at least one solar cell to a body of a flashlight, connecting the at least one solar cell to a battery such that electrical output of the solar cell can charge the battery, and connecting a switch and a lamp to the at least one solar cell and the battery such that a user can actuate the switch to connect the battery to the solar cell for charging of the battery or to the lamp for generation of light from the flashlight.

8 Claims, 5 Drawing Sheets

U.S. PATENT DOCUMENTS

| | | |
|---|---|---|
| 5,418,433 A | 5/1995 | Nilssen |
| 5,436,548 A | 7/1995 | Thomas |
| 5,463,539 A | 10/1995 | Vandenbelt et al. |
| 5,692,825 A | 12/1997 | Shalvi |
| 5,730,013 A | 3/1998 | Huang |
| 5,818,132 A | 10/1998 | Konotchick |
| 5,909,062 A | 6/1999 | Krietzman |
| 5,975,714 A | 11/1999 | Vetorino et al. |
| 6,006,562 A | 12/1999 | Wolter |
| 6,190,018 B1 | 2/2001 | Parsons et al. |
| 6,220,719 B1 | 4/2001 | Vetorino et al. |
| 6,357,890 B1 | 3/2002 | Parsons et al. |
| 6,511,214 B1 | 1/2003 | Parsons et al. |
| 6,563,269 B2 * | 5/2003 | Robinett et al. ........ 315/86 |
| 6,729,744 B2 | 5/2004 | Mah |
| 6,749,317 B1 | 6/2004 | Parsons et al. |
| 6,786,616 B1 | 9/2004 | Parsons et al. |
| 6,796,672 B2 | 9/2004 | Parsons |
| 6,808,288 B2 | 10/2004 | Mah |
| 6,824,292 B2 | 11/2004 | Parsons et al. |
| 6,827,475 B2 | 12/2004 | Vetorino et al. |
| 6,857,757 B2 | 2/2005 | Parsons et al. |
| 6,860,615 B2 | 3/2005 | Parsons |
| 6,893,141 B2 | 5/2005 | Mah |
| 6,936,937 B2 | 8/2005 | Tu et al. |
| 6,945,667 B2 | 9/2005 | Parsons |
| 6,951,410 B2 | 10/2005 | Parsons |
| 6,959,997 B2 | 11/2005 | Parsons |
| 6,991,344 B2 | 1/2006 | Parsons |
| D524,038 S | 7/2006 | Leung |
| 7,670,023 B1 * | 3/2010 | Peterson ........ 362/183 |
| 2004/0022056 A1 | 2/2004 | Parsons |
| 2004/0105253 A1 | 6/2004 | Parsons |
| 2005/0073831 A1 | 4/2005 | Parsons |
| 2007/0217188 A1 | 9/2007 | Klipstein et al. |

* cited by examiner

FLASHLIGHT WITH PHOTOVOLTAIC POWER SOURCE

CROSS-REFERENCE TO RELATED APPLICATIONS

This application is a continuation of U.S. application Ser. No. 11/748,756, filed May 15, 2007, entitled "FLASHLIGHT WITH PHOTOVOLTAIC POWER SOURCE," which claims the priority benefit of U.S. Provisional Application 60/800,923 filed May 15, 2006 entitled "SOLAR FLASHLIGHT" which are hereby incorporated by reference in their entirety.

BACKGROUND OF THE INVENTION

1. Field of the Invention

The invention relates to the field of portable lighting that can include hybrid or multiple power sources including photovoltaic panels.

2. Description of the Related Art

A wide variety of portable light sources have been developed to provide portable utility lighting generally for temporary use when the ambient lighting is insufficient for the user's needs. One broad category of such portable lighting devices is generally referred to as flashlights. Flashlights are generally configured for handheld use and include a self-contained power supply such that a user can manipulate the flashlight by hand and direct the emitted light where desired.

The two typical power sources employed in flashlights are either an electrochemical battery source or an electromechanical generator employing the Faraday effect. Battery power sources for flashlights can comprise disposable type battery sources such as alkaline or lithium based batteries and/or rechargeable battery sources such as nickel cadmium and/or nickel metal hydride. Battery power sources offer the advantage of a relatively long useful life, low-cost, ready availability, and a well-understood and developed technology. Battery power sources do have the disadvantage, however that they are subject to passive discharge over time, even if the flashlight is not used. Thus, a user can find that the battery power source has discharged rendering the flashlight unable to provide the desired light. Unfortunately, such discovery of a depleted battery state frequently occurs at the time of need of the auxiliary light.

Flashlights with rechargeable batteries can be configured for extended connection to a grid power source such that the rechargeable batteries are kept in a state of charge. However, such a configuration of flashlights places the limitation on a user that the flashlights remain connected to the power grid to maintain the battery state of charge. This would limit the ability to maintain the rechargeable battery's state of charge should the user wish to keep the flashlight in a location not provided with a connection to the electrical grid, for example in a vehicle.

Electromechanical generating power sources operating on the Faraday effect have the advantage of independence from the electrical grid. A user can provide mechanical work, typically either reciprocating linear "shaking" motion or rotational motion, such as by rotating a hand crank. Such electromechanical generating systems are frequently supplemented by a short-term electrical energy storage element, such as one or more capacitors to reduce the need for the user to continuously provide mechanical work while light output is desired. However, the storage capacity of such auxiliary energy storage elements is often of relatively low capacity such that the user has only a relatively brief period of light output from the auxiliary storage element before additional work energy must be provided to resume light output from the flashlight. Such electromechanical generating systems also suffer the disadvantage that the mechanical work and motion involved can produce wear thereby limiting the useful life of the flashlight. Electromechanical generation is also inconvenient as a user must at least periodically direct their attention and effort to powering the flashlight rather than the task at hand.

SUMMARY OF THE INVENTION

Embodiments of the invention are based at least in part on a recognition that there exists an unsatisfied need for a flashlight design that is inexpensive to produce and sell and is convenient in use that avoids the aforementioned drawbacks in existing flashlight designs. More particularly, there exists a need for a flashlight design that avoids the problems of battery discharge during periods of non-use and also the mechanical complexity and limited passive use life of electromechanical generating sources. It would be a further advantage to provide a flashlight design employing technology perceived to be renewable and environmentally friendly, as such a design would have considerable market appeal.

One embodiment includes a flashlight comprising a photovoltaic power source adapted to convert incident light energy to electrical energy and wherein the flashlight is configured such that the flashlight is induced to orient the photovoltaic power source to face upwards when the flashlight is placed on a smooth level surface. Another embodiment includes a portable hybrid power source comprising a photovoltaic panel adapted to convert light energy into electrical energy and wherein the power source is configured to self-orient the panel generally upwards, electrical energy storage connected to the photovoltaic panel to receive and store electrical energy received therefrom, and a switch to selectively connect and disconnect the electrical energy storage to a load.

A further embodiment includes a method of powering a flashlight, the method comprising attaching at least one solar cell to a body of a flashlight, connecting the at least one solar cell to a battery such that electrical output of the solar cell can charge the battery, and connecting a switch and a lamp to the at least one solar cell and the battery such that a user can actuate the switch to connect the battery to the solar cell for charging of the battery or to the lamp for generation of light from the flashlight.

Yet a further embodiment includes a flashlight comprising a housing defining at least one opening, a photovoltaic panel arranged generally within the opening such that incident light can pass through the opening and impinge the photovoltaic panel, and at least one power storage element secured within the housing so as to define a mass asymmetry of the flashlight such that gravity acts to induce the photovoltaic panel generally towards an upwards facing orientation. These and other objects and advantages of the invention will become more apparent from the following description taken in conjunction with the accompanying drawings.

DETAILED DESCRIPTION OF THE PREFERRED EMBODIMENT

Figure 1:
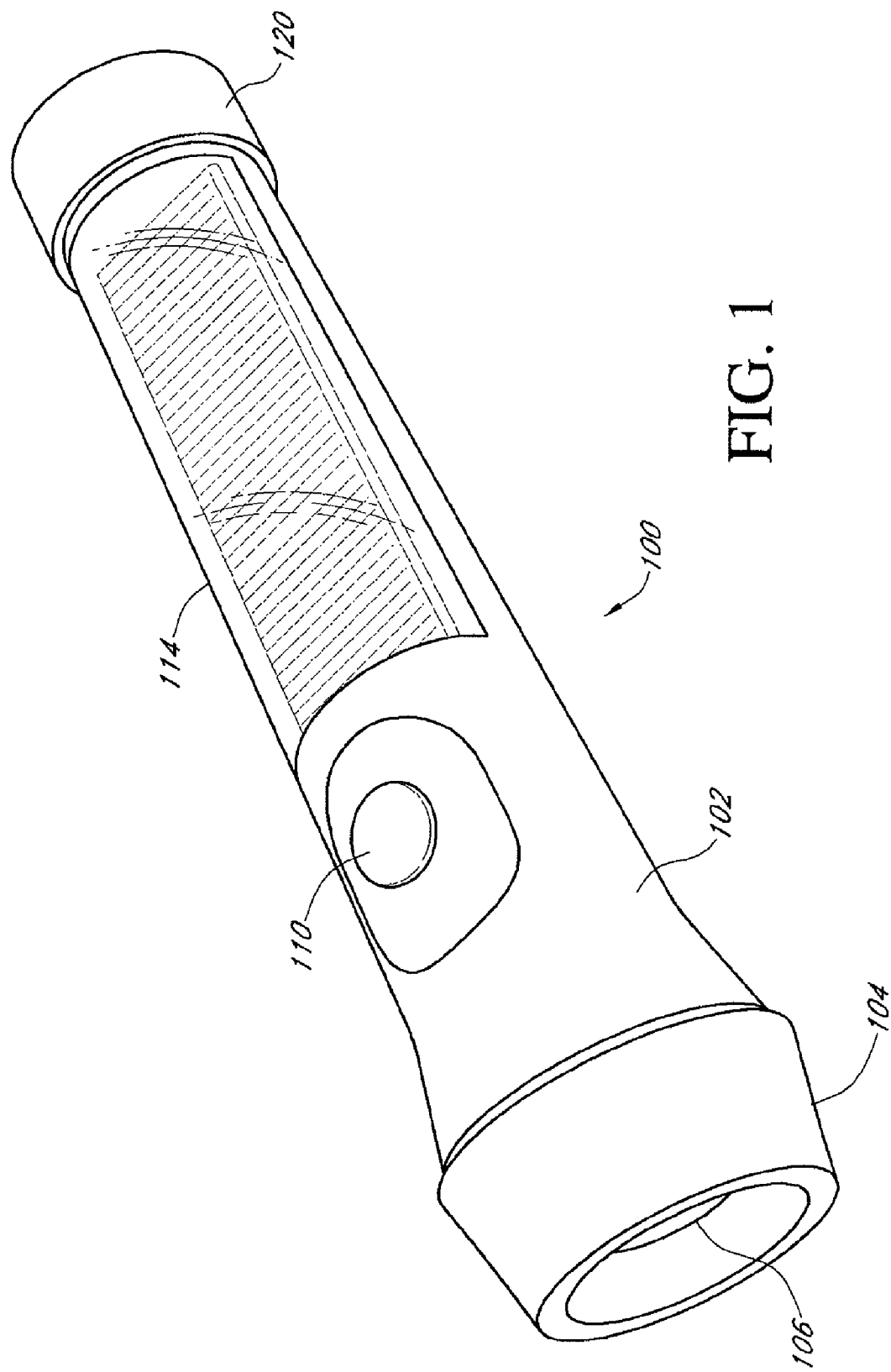
FIG. 1 is a perspective view of one embodiment of a flashlight with photovoltaic power source.

FIG. 1 illustrates one embodiment of a flashlight having a photovoltaic power source 100, hereafter flashlight 100 for brevity. The flashlight 100 is adapted to convert incident light energy, such as from sunlight and/or ambient artificial lighting into electrical energy and to use this converted electrical energy to power a lamp of the flashlight 100 to provide convenience lighting for the user. The photovoltaic capabilities of the flashlight 100 are a renewable low environmental impact power source. The flashlight 100 utilizes existing ambient lighting to power the flashlight 100 without requiring mechanical work provided by the user, for example, to shake a linear reciprocating shake type, or to turn a crank to power a Faraday effect electromechanical converter. The flashlight 100 is further adapted to provide a dependable energy reserve such that the usefulness of the flashlight 100 is maintained during periods of non-use without requiring the investment, inconvenience, and environmental impact of replaceable batteries. These and other advantages of the flashlight 100 will be described in greater detail following a description of additional components of the flashlight 100.

In one embodiment, the flashlight 100 comprises a generally tubular body 102. The body 102 provides structural support for other components of the flashlight 100 as well as a gripping or grasping surface for the user. The body 102 is preferably formed of relatively light weight and high strength materials having resistance to degradation from exposure to the environment. In one embodiment, ABS plastic materials provide desirable mechanical and chemical properties for the body 102 as well as providing a material that is easily formed in the desired shape and contour.

In one embodiment, the flashlight 100 further comprises a front cap 104 and lens 106 which are configured to enclose a forward end of the body 102. The front cap 104 is similarly preferably formed of a relatively strong and durable material having resistance to degradation upon exposure to the environment and in certain embodiments can comprise the same or similar material as that comprising the body 102. In certain embodiments, the front cap 104 can comprise a resilient material, such as polyurethane and/or rubber. The lens 106 is preferably formed of a material that is substantially transparent to the light generated by the flashlight 100 and is further preferably comprised of a relatively scratch resistant material resistant to breakage. A variety of glass, plastic, and/or crystalline materials will be well known to one of ordinary skill for use in manufacture of the lens 106.

In one embodiment, the flashlight 100 further comprises a switch assembly 110 adapted to actuate the light generating capabilities of the flashlight 100. In one embodiment, the switch 110 is configured as a toggle or bi-state switch such that the flashlight can be operated into either an on or off condition. Thus, in certain embodiments, the flashlight 100 only generates light when desired by the user by actuation of the switch assembly 110.

In one embodiment, the body 102 of the flashlight 100 is further configured to support a photovoltaic array 112. The photovoltaic array 112 is adapted to receive incident light energy and to convert this light energy into electrical energy in a manner well understood by one of ordinary skill. In various embodiments, the photovoltaic array 112 can be formed on a monocrystalline substrate, a polycrystalline silicon substrate, and/or a thin film-type substrate. In general, monocrystalline silicon embodiments of the photovoltaic array 112 offer improved conversion efficiency, particularly in environments of somewhat dimmer light thereby improving the performance of the flashlight 100. In general, photovoltaic arrays 112 embodied with monocrystalline silicon substrates are more expensive. In general, embodiments of the photovoltaic array 112 embodied in polycrystalline silicon and/or thin film type substrates are less expensive to produce and market, however, may offer somewhat reduced performance, particularly in environments where the incident light is of a lower intensity. In general, the photovoltaic array 112 is preferably of a generally robust construction such that inadvertent or unintentional shocks or vibrations which may be transmitted to the flashlight 100 during use are less likely to damage the photovoltaic array 112 and the functionality of the flashlight 100.

In one embodiment, the flashlight 100 further comprises a window or cover 114 arranged to enclose the photovoltaic array 112. The window 114 is preferably formed of a material having substantial transparency to the incident light energy to facilitate greater conversion efficiency of the photovoltaic array 112. The window 114 is further preferably formed of materials having relatively high strength and scratch resistance and also having resistance to degradation upon exposure to environmental factors. The window 114 can also be contoured to define, at least in part, an ergonomic gripping surface.

In one embodiment, the window 114 is preferably engaged with the body 102 so as to substantially provide a closed environment for the photovoltaic array 112. These embodiments provide the advantage of inhibiting exposure of the photovoltaic array 112 to dust, dirt, moisture, and/or other environmental contaminants which might degrade or impair the efficiency and life expectancy of the photovoltaic array 112. In one embodiment, the window 114 is joined or sealed to the body 102 using radiofrequency irradiation to melt the window 114 into engagement with the body 102. In other embodiments, the window 114 can be sealed to the body 102 via other materials and/or processes such as gluing, friction welding, ultrasonic welding, friction fit, and/or molding or forming as a single unified piece.

In one embodiment, the flashlight 100 further comprises a rear cap 120. The rear cap 120 will generally be formed of similar materials to the front cap 104. In certain embodiments, the rear cap 120 may further comprise structure or mounting points for retaining and/or manipulating features, such as lanyards, D-rings, chains, tethers, etc. In certain embodiments, the rear cap 120 can also comprise further fixation or manipulation components such as a magnet to attach the flashlight 100 to ferromagnetic surfaces, and/or hook and loop tape to facilitate of the flashlight 100 to a corresponding piece of hook and loop tape attached at a desired mounting location.

Figure 2:
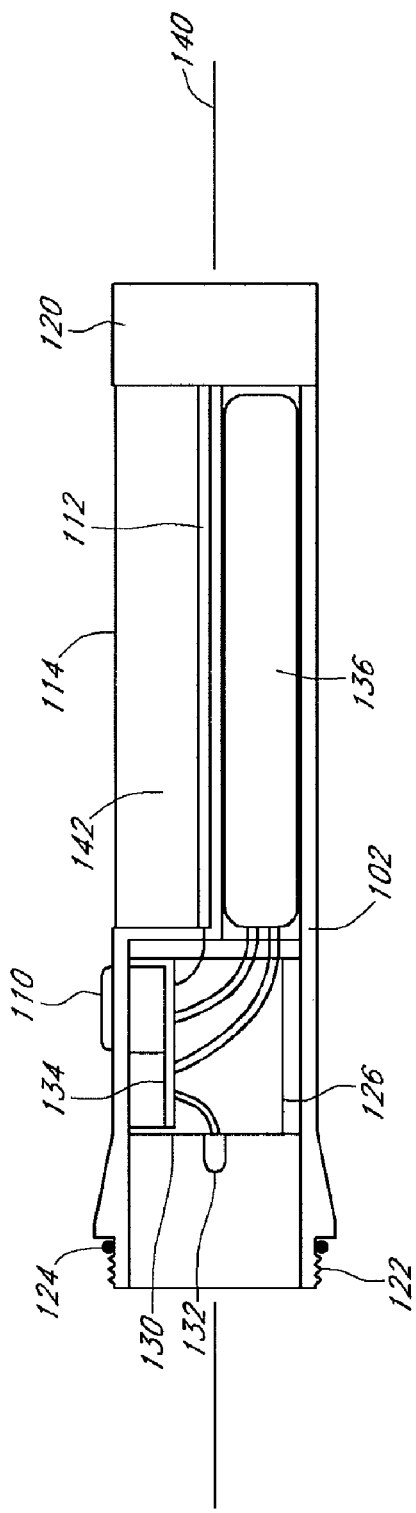
FIG. 2 is a side section view of one embodiment of a flashlight with photovoltaic power source.

FIG. 2 illustrates in side section view one embodiment of a flashlight 100. In this embodiment, the body 102 comprises an engagement surface 122 arranged at the forward end of the body 102. The engagement surface 122 is configured to engage with the front cap 104 for attachment to the body 102. In one embodiment, the engagement surface 122 comprises a threaded engagement between the body 102 and the front cap 104. In other embodiments, the engagement surface 122 can comprise a friction fit, an adhesive seal, a welded joint, or other manner of attaching two components. In this embodiment, the flashlight 100 also comprises a seal 124, such as an O-ring type seal arranged to further seal the contact between the body 102 and the front cap 104.

As previously noted, the lens 106 is preferably formed of a material having substantial transparency to light generated by the flashlight 100 and also of a material resistant to scratching, breakage, and degradation to environmental factors. In certain embodiments, the lens 106 can also provide optical refraction of the light generated by the flashlight 100. In these embodiments, the engagement between the front cap 104 and body 102 can be configured for adjustment. Thus, for example, in certain embodiments, the engagement between the front cap 104 and the body 102 can be adjusted longitudinally along the major axis of the flashlight 100 to adjust the light output beam pattern of the flashlight 100.

In this embodiment, the flashlight 100 further comprises a support 126 configured to fit within the body 102 and generally at the forward end thereof. The support 126 provides additional structural strength to the flashlight internally of the body 102, for example, to resist distortion and damage upon application of external force. The support 126 is also configured to provide mechanical support and mounting location for several other components of the flashlight 100.

More particularly, in one embodiment, the support 126 is configured for attachment and support of a reflector 130 and lamp 132. The lamp 132 is adapted to generate light upon application of suitable electrical power to provide the light generating capabilities of the flashlight 100. In certain embodiments, the lamp 132 comprises one or more light emitting diodes (LEDs). LEDs provide relatively powerful light generating capability and relatively low power consumption. In other embodiments, the lamp 132 comprises conventional incandescent or filament-type bulbs. The reflector 130 is arranged generally inwardly from the lamp 132 and provides a highly reflective surface to facilitate outward direction of the light generated by the lamp 132.

Figure 4:
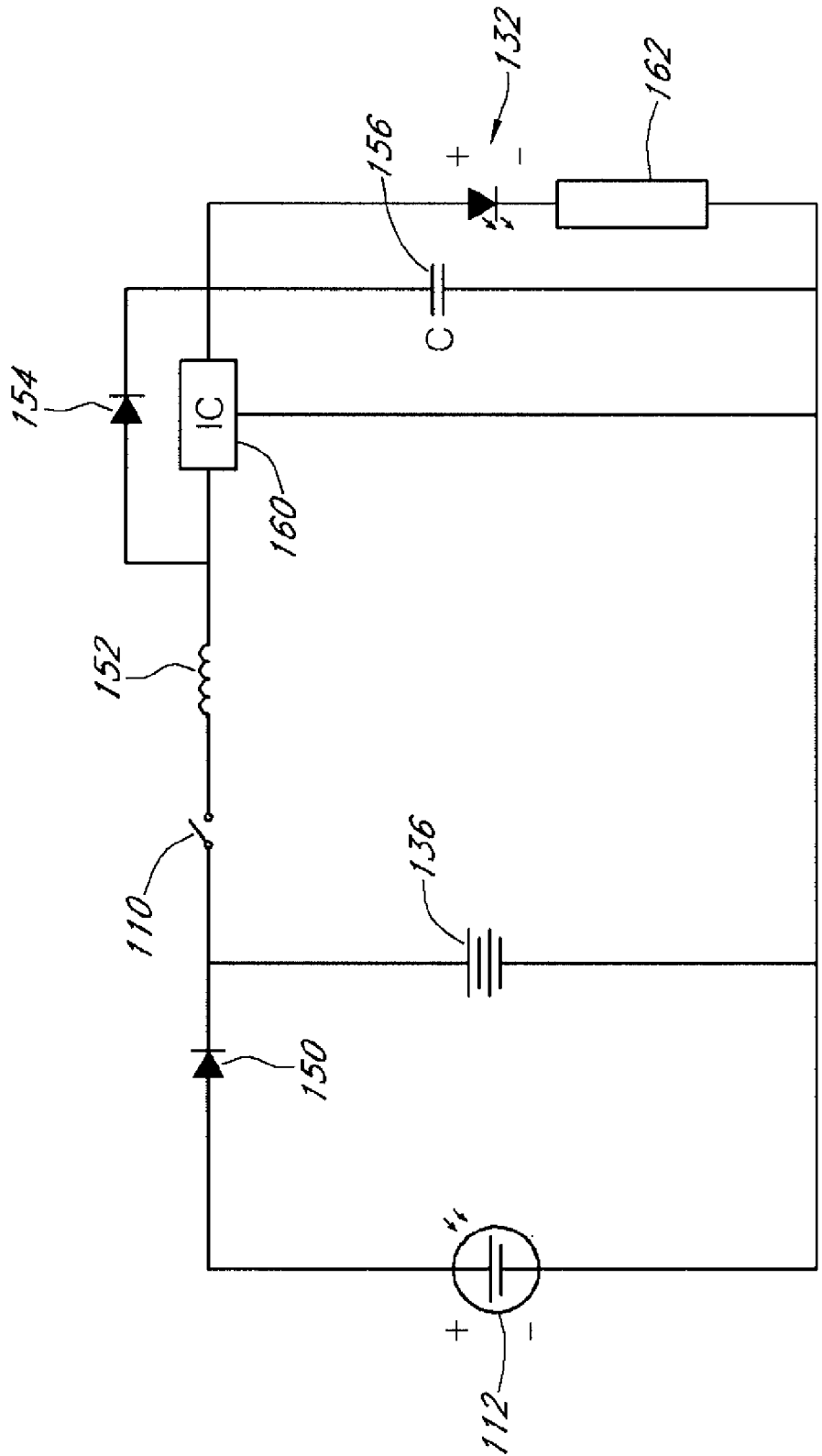
FIG. 4 is a circuit diagram of one embodiment of a flashlight with a photovoltaic power source.

The support 126 is also adapted in this embodiment to support a circuit board 134 and the switch assembly 110. The circuit board 134 comprises various electrical components adapted for generation and control of the electrical power to be provided to the lamp 132. Additional details of the components and their connection as at least partially mounted on the circuit board 134 will be described in greater detail below with respect to an exemplary circuit diagram of the flashlight 100 as illustrated by FIG. 4.

The flashlight 100 also comprises a battery pack 136. The battery pack 136 comprises one or more battery cells which are preferably configured with rechargeable battery chemistries. For example, in certain embodiments, the battery pack 136 is preferably configured as a rechargeable NiCad and/or NiMH type battery. In this embodiment, the battery pack 136 ranged generally below the photovoltaic array 112 and window 114 and extending generally from the rearward end of the support 126 to the rear cap 120.

Figure 3:
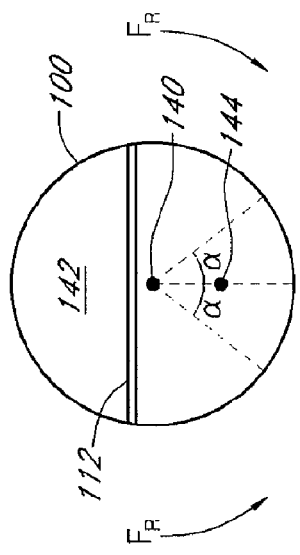
FIG. 3 is an end section schematic illustration of one embodiment of a flashlight with photovoltaic power source and self-righting aspects thereof.

The flashlight 100 also defines a roll axis 140 about which the flashlight 100 can rotate when placed on a surface. In embodiments wherein the flashlight is generally cylindrical, the roll axis 140 is generally coincident with the major longitudinal symmetrical axis of the flashlight 100. As can be seen in FIGS. 2 and 3, the flashlight 100 defines an air space 142 arranged generally above the photovoltaic array 112 and underneath the window 114. The flashlight 100 further defines a center of mass 144. As the battery pack 136 is in at least certain embodiments a relatively high mass and dense component of the flashlight 100, in certain embodiments the center of mass 144 is located within the volumetric extent of the battery pack 136. Regardless of the precise location of the center of mass 144, it will be generally preferred that the center of mass 144 be located away from the roll axis 140 and arranged underneath, e.g., opposite the surface of the photovoltaic array 112 adapted to receive and convert incident light energy.

This aspect of the flashlight 100 provides the advantage of a self-righting or orienting capability to the flashlight 100. More particularly, as the center of mass 144 is preferably arranged below or opposite the operating face of the photovoltaic array 112 and further preferably arranged displaced from the roll axis 140, the flashlight 100 tends to roll upright when placed on a relatively level and smooth surface. More particularly, if the flashlight 100 is displaced by an angle a away from an upright vertical orientation, restoring forces tend to roll the flashlight 100 towards the clockwise or counter-clockwise direction, respectively, depending on the displacement from vertical. These restoring forces acting on the flashlight 100 due to the relative placement of the center of mass 144 with respect to the photovoltaic array 112 and roll axis 140 act to induce the flashlight 100 to an orientation where the photovoltaic array 112 is directed more preferably to receive incident light energy.

In general, ambient light such as sunlight and ambient artificial lighting propagates generally from an overhead direction downwards. Thus, by incorporating a self-righting or orienting capability, the flashlight 100 automatically orients itself to a position more favorable to efficiently converting incident light energy to electrical energy. This facilitates maintenance of charge in the flashlight 100 to have the stored electrical charge available for use in powering the lamp 132 when a user desires to use the flashlight 100. This self-righting capability is a property of the flashlight 100 and does not require deliberate manipulation by a user other than simply being left in a location exposed to ambient light at least periodically and in a position such that the flashlight 100 is at least partially free to orient itself towards the ambient light.

In certain embodiments, the photovoltaic array 112 is pivotably mounted in the flashlight 100 and provided with counterbalancing to provide a self-orienting feature towards a vertical or upwards orientation. For example, the photovoltaic array 112 can be arranged to pivot within the body 102 of the flashlight such that the photovoltaic array 112 can pivot or rotate independently of the body 102 of the flashlight 100. This embodiment can be preferred in applications where the flashlight may be placed on surfaces resistant to rolling. For example, if the flashlight is placed on a relatively level but soft surface such as a sofa or bed, the flashlight 100 may tend to sink into the surface, thereby impeding the ability of the flashlight 100 to roll to an upwards orientation. However, the independently movable photovoltaic array 112 can still rotate under influence of gravity acting on the counter balancing towards an upwards orientation.

FIG. 4 illustrates an exemplary circuit diagram of one embodiment of a flashlight 100 having a photovoltaic power source. As seen in FIG. 4, in one embodiment, the flashlight comprises the photovoltaic array 112. While the circuit schematic of FIG. 4 illustrates the circuit diagram for a solar cell, it will be understood that it will generally be preferred to utilize an array of individual solar cells for improved light-electrical energy conversion capacity.

In this embodiment, the flashlight 100 also comprises the battery pack 136. While illustrated in this embodiment by the circuit symbol for a battery, it will be understood that in certain implementations it will be preferred that the battery pack 136 comprise a plurality of individual battery cells. It will be further understood that in certain embodiments the battery pack 136 comprise a plurality of battery cells arranged in parallel and series to increase the electrical energy capabilities of the battery pack 136.

It will be further understood that while illustrated by the circuit diagram of a battery, the function of the battery pack 136 is as an electrical energy storage module. For example, one or more storage capacitors can be employed to store electrical energy in other embodiments of energy storage. Thus, rather than employing electrical energy storage based on electrochemical cell chemistries, parallel plate capacitor structures can also serve the purpose of electrical energy storage. However, it will be generally preferred to employ at least one rechargeable battery cell as battery cells generally have higher energy storage capacity per unit volume and a higher mass density. This facilitates production of flashlights 100 having longer useful lives without excessive size and to providing the self-righting features in a convenient size envelope.

In this embodiment, a diode 150 is connected in series with the photovoltaic array 112 and further connected therewith in parallel with the battery pack 136. It will generally be preferred that the characteristics of the photovoltaic array 112 and diode 150 be generally matched to the battery pack 136. For example, it will be generally be preferred that the output voltage of the photovoltaic array 112 (minus any forward drop of the diode 150) substantially match a charge voltage of the battery pack 136. This facilitates relatively complete charging of the battery pack 136 without indicating the additional complication of voltage/current regulation to avoid potentially damaging the battery pack 136 by overcharging.

In this embodiment, the flashlight 100 further comprises the switch assembly 110 connected in series with the parallel connection of the battery pack 136 and the photovoltaic array 112 and diode 150. The switch assembly 110 provides the ability for a user to open and close a circuit between the photovoltaic array 112 and the battery pack 136 and the remainder of the circuit. Thus, when the switch assembly 110 is in the open position, the output of the photovoltaic array 112 is available to charge the battery pack 136.

While in certain embodiments the output of the photovoltaic array 112 is sufficient for extended powering of the lamp 132, in certain embodiments, the output of the photovoltaic array 112 is insufficient for complete illumination of the lamp 132 or for illumination for an extended period. Inclusion of the switch assembly 110 provides the capability of the photovoltaic array 112 to charge the battery pack 136 during periods of non-use of the flashlight 100. This facilitates reduction in size of the components of the flashlight 100, for example, such as the photovoltaic array 112 and the battery pack 136 while maintaining the capability to provide the desired light output when the user desires the same.

In this embodiment, the flashlight 100 further comprises an inductor 152, a diode 154 and a capacitor 156 connected in series with the switch assembly 110. The inductor 152, diode 154, and capacitor 156 provide a filter or damping circuit to buffer transients generated by opening and closing the switch assembly 110. The capacitor 156 is arranged to inhibit D.C. discharge of the battery pack 136 when the switch 110 is closed.

In this embodiment, the flashlight 100 further comprises a power regulator 160 connected in series with the lamp 132 and a resistor 162. The power regulator 160 and resistor 162 provide a controlled current and voltage to the lamp 132. Particularly in embodiments where the lamp 132 comprises one or more LEDs, control of the current and voltage provided to the lamp 132 is important for long life and proper operation of the lamp 132.

Figure 5:
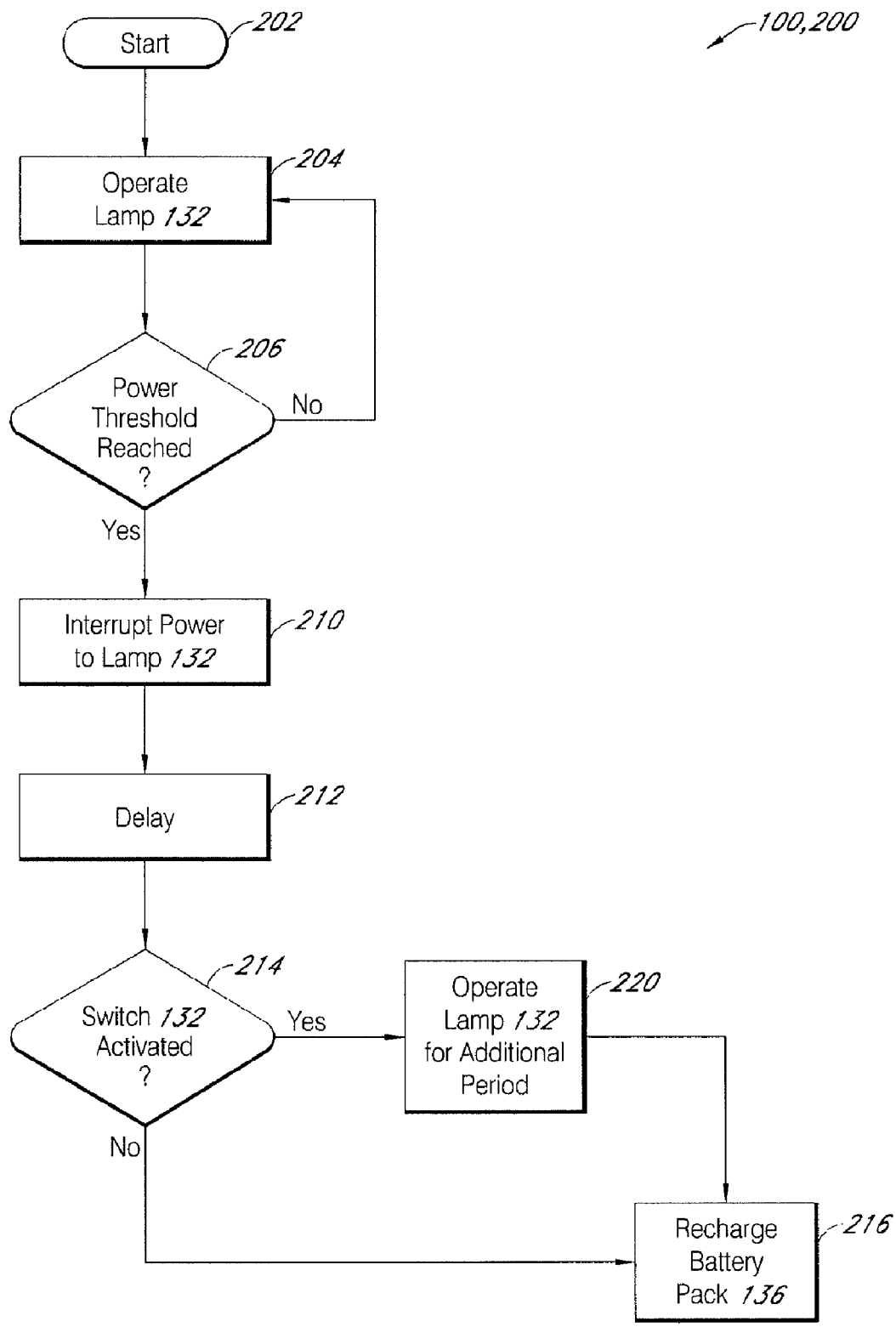
FIG. 5 is a flow chart illustrating operation of one embodiment of a flashlight with photovoltaic power source.

FIG. 5 illustrates one embodiment of a method of operation 200 of a flashlight 100. The method 200 begins in a start block 202 typically associated with actuation of the switch assembly 110. Following the start block 202, the flashlight 100 operates the lamp 132 thereby generating user directable light in a block 204.

Throughout the operation of the lamp 132 during block 204, a decision block 206 proceeds wherein a determination is made whether a power threshold has been reached. The decision block 206 generally evaluates whether the battery pack 136 has been depleted below the determined threshold. If the determination of block 206 is negative, the lamp continues to operate in block 204.

If, however, the determination of block 206 is affirmative, e.g., that the battery pack 136 has been depleted below the determined threshold, a block 210 follows wherein power to the lamp is interrupted. Block 210 is followed by a delay block 212 to provide a delay. The delay block 212 provides a period of time for the battery pack 136 to partially recover for further operation of the lamp 132. The interruption of power of block 210 and delay of block 212 also provide an alert or annunciation to the user that the battery pack 136 is nearing depletion.

Following the delay block 212, a decision block 214 follows wherein a determination is made whether the switch 110 has been reactivated. If the switch 110 has not been reactivated, a block 216 follows wherein the battery pack 136 is recharged via the photovoltaic array 112. If the decision of block 214 is affirmative, a block 220 follows wherein the lamp 132 operates for an additional period determined generally by the remaining available energy capacity of the battery pack 136. Certain aspects of the method 200 provide the advantage that a user is provided an additional reserve capacity beyond an initial notification that the capacity of the battery pack 136 is nearing depletion. This provides a valuable notification to the user to make a provision for an alternative supplemental light source.

Figure 6:
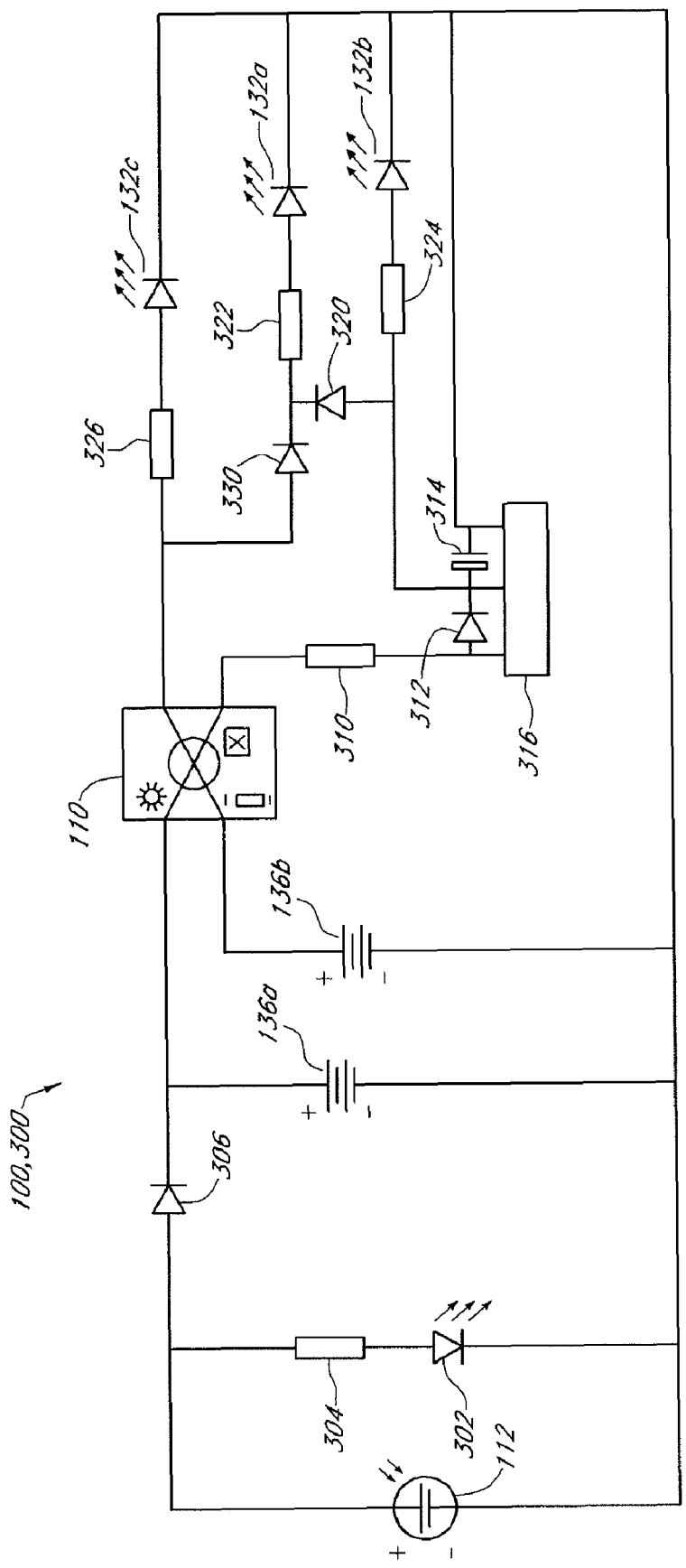
FIG. 6 is a circuit diagram of one embodiment of a flashlight with a photovoltaic power source.

FIG. 6 illustrates a schematic circuit diagram 300 for a further embodiment of flashlight 100 having a photovoltaic power source. In this embodiment, the flashlight 100 comprises one or more photovoltaic arrays 112 adapted to convert incident light energy to electrical energy and can be substantially similar to the photovoltaic arrays 112 previously described. In this embodiment, an indicator 302 is connected in series with a current limiting resistance 304 which are together connected in parallel with the photovoltaic array 112. In one embodiment, the indicator 302 comprises a relatively low power light-emitting diode (LED). The indicator 302 provides a visual, tactile, audible or other notification that the photovoltaic array 112 is receiving sufficient light energy and converting this incident light energy into sufficient electrical energy for operation of the flashlight 100.

In this embodiment, a diode 306 is connected in series with the photovoltaic array 112 and further connected in series with a first battery 136a. In this embodiment, the first battery 136a comprises a rechargeable-type battery, such as a nickel metal hydride, nickel cadmium, and/or other rechargeable type battery. It will be understood that the circuit symbol for the first battery 136a is simply schematic in nature and that in actual implementation the first battery 136a can comprise one or multiple individual battery cells.

The first battery 136a is configured to receive and store electrical energy from the photovoltaic array 112 during periods of nonuse of the flashlight 100 so as to recharge the reversible battery chemistry of the first battery 136a. This embodiment provides beneficial aspects similar to the embodiments previously described in that the rechargeable battery chemistry of the first battery 136a allows the flashlight 100 to be repeatably recharged via conversion of incident light energy to electrical energy and discharged to generate light from the flashlight 100 without requiring a user to input mechanical energy, for example, to operate a Faraday effect based electrochemical energy conversion apparatus or to incur the expense and inconvenience of replacing single use batteries.

In this embodiment, the flashlight 100 also comprises a second battery 136b. In one embodiment, the second battery 136b is of a disposable or non-rechargeable type battery chemistry, such as an alkaline type battery and/or a lithium battery. In this embodiment, the second battery 136b is provided as a backup or reserve power source in case a user may wish to use the flashlight 100 when the first battery 136a lacks sufficient charge to power the flashlight 100. This aspect provides the advantage that the user can continue to utilize the flashlight 100 even though insufficient time or inadequate incident light has existed since a previous use of the flashlight 100 to adequately recharge the first battery 136a.

In this embodiment, the flashlight 100 further comprises a switch 110 configured to allow a user to select among different operating modes of a flashlight 100. In this embodiment, the switch 110 includes an off position wherein both the solar panel 112 and first battery 136a as well as the second battery 136b are disconnected from lamp elements such that the flashlight 100 is selected to a quiescent or off condition. In one embodiment, the switch is configured with markings or particular contouring to indicate to a user the functionality of the off position. For example, the off position of the switch 110 can be indicated with indicia for the off condition, such as an X arranged within a box, or "off" lettering. In certain embodiments, in the off condition, the flashlight 100 can continue to operate the indicator 302, for example, by illuminating a relatively low-power LED to indicate to a user when the photovoltaic array 112 is operating so as to provide charging potential to the first battery 136a.

In this embodiment, the switch 110 also comprises a "solar panel" position wherein operating power for the flashlight 100 is drawn from the first battery 136 as charged by the output of the photovoltaic array 112. In this embodiment, the "solar panel" position of the switch 110 is designated by a corresponding indicator, such as a sun symbol or the terms solar, solar power, rechargeable, or similar. Power from the first battery 136 and photovoltaic array 112 is provided via the switch 110 to a resistance 310, a diode 312, a capacitor 314, and a power regulator 316, a diode 320, a resistance 322, a first lamp 132a, a resistance 324, and a second lamp 132b.

In this embodiment, the switch 110 also comprises a reserve or battery power position corresponding to providing power to the flashlight 100 from the second battery 136b. In certain embodiments, the switch 110 is configured to indicate the reserve or battery power position with a battery symbol or lettering. Power is supplied from the second battery 136b via the switch 110 to a resistance 326 connected in series with a third lamp 132c as well as to a diode 330 and the resistance 322 and first lamp 132a.

In certain embodiments, multiple lamps, such as the first lamp 132a and second lamp 132b or first lamp 132a and third lamp 132c can be simultaneously illuminated both to provide additional light output from the flashlight 100 than might be available from only a single lamp and also to provide a secondary indication of the power source currently operative for the flashlight 100. For example, in one embodiment, one or more of the lamps 132a through 132c can generate a distinctive pattern of light. For example, in one embodiment, the first lamp 132a is configured to generate a generally white light and one or both of the second lamp 132b and third lamp 132c can generate light having a distinctive color. For example, the third lamp 132c can be configured to generate a generally yellow tinted light such that a user can discern from the light output of the flashlight 100 coming from the first lamp 132a and the third lamp 132c that the flashlight 100 is operating on the reserve power provided by the second battery 136b. In one embodiment, the second lamp 132b can be configured to generate a generally green tinted light, for example, to indicate an environmentally friendly or "green" renewable power source, such as from the photovoltaic array 112 and first battery 136a.

In one embodiment, the flashlight 100 also comprises multiple independent indicators adapted to indicate the operating mode of the flashlight 100. In one embodiment, a first indicator can operate, for example by emitting red light, that the flashlight 100 is being recharged. A second indicator, for example a yellow lamp, can operate to indicate that the flashlight 100 is operating under power from the photovoltaic array 112. A third indicator can operate, for example by emitting green light, that the flashlight is operating from reserve power, such as from the second battery 136b.

Although the above disclosed embodiments of the present teachings have shown, described and pointed out the fundamental novel features of the invention as applied to the above-disclosed embodiments, it should be understood that various omissions, substitutions, and changes in the form of the detail of the devices, systems and/or methods illustrated may be made by those skilled in the art without departing from the scope of the present teachings. Consequently, the scope of the invention should not be limited to the foregoing description but should be defined by the appended claims.

What is claimed is:

1. A flashlight comprising a photovoltaic power source adapted to convert incident light energy to electrical energy and wherein the flashlight is configured such that the flashlight has a smooth outer surface that permits free rotation of the flashlight and the flashlight is induced to orient the photovoltaic power source to face upwards when the flashlight is placed on a generally horizontal surface and wherein the flashlight includes a rechargeable battery that is recharged by the photovoltaic power source and a disposable battery and wherein the flashlight is selectively powered by either the rechargeable battery or the disposable battery, and wherein the flashlight includes a transparent window to receive light energy for increased energy conversion in said photovoltaic power source, and wherein the flashlight includes a first indicator light to indicate the recharging mode, a second indicator light to indicate that the flashlight is powered by the photovoltaic cell, and a third indicator light to indicate that the flashlight is powered by reserve power from the disposable battery.

2. The flashlight of claim 1, further comprising a switch and wherein light output is activated via actuation of the switch.

3. The flashlight of claim 2, wherein the switch comprises a multi-position switch configured to select between the rechargeable battery and the disposable battery.

4. The flashlight of claim 1, further comprising a lamp having at least one light emitting diode.

5. The flashlight of claim 1, further comprising a window arranged to enclose the photovoltaic power source.

6. A flashlight comprising a photovoltaic power source adapted to convert incident light energy to electrical energy, comprising: a flashlight body wherein the photovoltaic power source has an upper surface disposed such that it is co-extensive with a cross section at the center of the flashlight body to provide said upper surface of the photovoltaic power source with the widest surface area for receiving incident light energy, and wherein the flashlight includes a rechargeable battery that is recharged by the photovoltaic power source, and a disposable battery is positioned at the rear end of said body for easy access, and wherein the flashlight is selectively powered by either the rechargeable battery or the disposable battery.

7. The flashlight of claim 6, further comprising a transparent window arranged to enclose the photovoltaic power source for maximizing the incident light energy received by the photovoltaic power source.

8. The flashlight of claim 6, further comprising a first indicator light to indicate the recharging mode, a second indicator light to indicate that the flashlight is powered by the photovoltaic cell, and a third indicator light to indicate that the flashlight is powered by reserve power from the disposable battery.

\* \* \* \* \*